(12) United States Patent
Lepage

(10) Patent No.: US 7,675,561 B2
(45) Date of Patent: Mar. 9, 2010

(54) TIME DELAYED INTEGRATION CMOS IMAGE SENSOR WITH ZERO DESYNCHRONIZATION

(75) Inventor: Gerald Lepage, Wavre (BE)

(73) Assignee: Cypress Semiconductor Corporation, San Jose, CA (US)

( * ) Notice: Subject to any disclaimer, the term of this patent is extended or adjusted under 35 U.S.C. 154(b) by 594 days.

(21) Appl. No.: 11/540,527

(22) Filed: Sep. 28, 2006

(65) Prior Publication Data
US 2008/0079830 A1 Apr. 3, 2008

(51) Int. Cl.
H04N 5/335 (2006.01)
H04N 5/228 (2006.01)
H04N 5/217 (2006.01)

(52) U.S. Cl. .................. 348/295; 348/208; 348/241

(58) Field of Classification Search .................. 348/295, 348/302, 208, 241, 243, 144, 222.1; 359/368
See application file for complete search history.

(56) References Cited

U.S. PATENT DOCUMENTS 5,149,954 A * 9/1992 Pettijohn et al. ......... 250/208.1
6,373,522 B2 * 4/2002 Mathews et al. ............ 348/144
6,456,318 B1 * 9/2002 Noguchi ..................... 348/87
6,504,574 B1 * 1/2003 Noguchi et al. ............ 348/295
6,563,539 B1 * 5/2003 Lefevre ..................... 348/295
6,906,749 B1 6/2005 Fox
7,027,093 B2 * 4/2006 Miyahara .................... 348/313
7,268,814 B1 * 9/2007 Pain et al. ................... 348/294

OTHER PUBLICATIONS

J.N. Walker, TRI/Princeton, Princeton, NJ, "Laboratory Applications of Time Delay and Integration (TDI) Image Acquisition", Electrim Corporation, Princeton, NJ, http://wwwv.electrim.com/tdipaper. html, IS&T May 1996, pp. 1-3.
Gerald Lepage et al., Cypress Semiconductor Corp., "CMOS Long Linear Array for Sapce Application", SPIE Digital Library, http://spiedl.aip.org/getabs/servlet/GetabsServelet?prog=normal&id=PSISDG006068000001, Published online Feb. 6, 2006, pp. 9 total.
Bedabrata Pain et al., "CMOS Image Sensors Capable of Time-Delayed Integration", National Aeronautics and Space Administration Contract No. NAS 7-918, Technical Support Package, NASA Tech. Brief, vol. 25, No. 4, JPL New Technology Report NPO-20802, Jet Propulsion Laboratory, California Institute of Technology, Pasadena, California, Apr. 1, 2001, pp. 11 total.

* cited by examiner

*Primary Examiner*—Nhan T Tran
*Assistant Examiner*—Trung Diep

(57) ABSTRACT

A time delayed integration image sensor provides oversampled image data on a time-shared column bus to maintain data synchronization.

18 Claims, 13 Drawing Sheets

(PRIOR ART)

TIME DELAYED INTEGRATION CMOS IMAGE SENSOR WITH ZERO DESYNCHRONIZATION

TECHNICAL FIELD

Embodiments of the present invention are related to field of image sensing and, in particular, to time delay and integration sensors.

BACKGROUND

Solid-state image sensors have found widespread use in digital camera systems. Solid-state image sensors use an array of picture elements (pixels), typically arranged in rows and columns, to convert electromagnetic (EM) energy (e.g., infrared, visible light, ultraviolet light, x-rays, etc) into a charge that can be detected and processed to generate a digital image. An array with only one line (one column or one row) of pixels is known as a linear array, while an array with multiple lines (multiple rows and columns) is known as an area array. While many different semiconductor processing technologies may be used to produce solid-state image sensors (e.g., NMOS, PMOS and BiCMOS), the two principle technologies used for solid-state image sensors are CMOS (complementary metal-oxide semiconductor) technology and CCD (charge-coupled device) technology.

CCD image sensors are based on charge generation (in response to EM energy exposure) within an array of pixels, and charge transfer across the array in a type of "bucket brigade" operation. Analog voltages corresponding to the charge generated at each pixel are read from the CCD sensor by applying clocking signals to transfer the charge in each row of pixels to the succeeding row (parallel transfer) and eventually to a serial register from which charges are clocked and transferred to a detector and amplifier.

CMOS image sensors also generate pixel charges in response to EM energy exposure. In contrast to CCD image sensors, however, the charges are not transferred from pixel to pixel. Rather, all of the pixels in a column of a CMOS sensor share a column bus and the signals are read out sequentially by the operation of switches (typically MOS field-effect transistors) within each pixel to achieve a column parallel, row serial readout order. Conventionally, both CCD arrays and CMOS arrays generate an n pixel by m pixel image from a sensor array having n rows and m columns.

Linear array (i.e., one line) CCD and CMOS sensors may be used to generate two dimensional images by repeatedly exposing and reading a single row sensor while moving the sensor in a direction orthogonal to the long dimension of the array. In this so-called "push broom" technique, the resulting image has a maximum width in pixels equal to the number of pixels in the linear array, and a theoretically unlimited length corresponding to the number of samples. This is the principle behind common scanning devices such as facsimile machines and document copiers.

In "push broom" imagers, the long dimension of a one-line imaging array (e.g., 1×512 pixels) is positioned perpendicular to the direction of the motion between the imaging platform and the imaged scene. The direction of the motion is known as the "along-track" direction and the direction perpendicular to the direction of motion is known as the "cross-track" direction. In the push broom method, the array is used to divide the scene into pixels in the cross-track direction and the imaging array is sampled in time to capture the scene in the along-track direction as the array moves. Ideally, the time sampling is synchronized with the velocity of the imaging array so that the image of the scene (in the focal plane of the imaging array) moves by the length of a pixel in the along-track direction in the time it takes to expose the pixel, extract image information from the pixel and condition the pixel for the next exposure. If this timing can be accomplished, then a two-dimensional image of the scene can be formed by processing a continuous sequence of one-line "slices." One significant problem with the push broom technique is that the charge integration time (exposure time) per slice is limited by the velocity of the imaging platform. Limited integration time translates to low signal levels (low charge generation) and a commensurately low signal-to-noise ratio (SNR) in the acquired image (every image sensor has noise sources such as shot noise and thermal noise). TDI was developed to increase the SNR of moving image sensors.

TDI image sensors (TDI imagers) use an area array image sensor to capture images from an imaging platform that is moving with a constant velocity relative to an imaged object or scene. One common application of TDI is terrestrial imaging from satellite or aircraft borne platforms where the imaged object or scene is known as the "ground scene." Other applications include the scanning of objects as they move on a conveyor belt, for example (i.e., machine vision). For clarity of explanation, the following background information uses terminology that applies to terrestrial imaging applications, although the concepts apply equally well to all TDI applications.

A TDI imager can be viewed (conceptually) as a stack of linear arrays (i.e., an area array), where every linear array moves over the same ground scene points (ground pixels), separated by the time required for the sensor to move one line with respect to the ground scene (the line time, $T_L$). Any particular ground scene point is sampled by a column of individual pixels in the array at multiples of the line time. If those individual pixel samples can be added or accumulated, then the SNR of the resulting image can be increased by a factor equal to the square root of n, where n is the number of pixels in a column of the TDI imager.

Conventionally, only CCD technology has been used for TDI applications because CCDs naturally operate by transferring charge from pixel to pixel across the focal plane of the sensor, allowing the charges to be to be integrated (added) from pixel to pixel as the sensor moves over a ground pixel in the imaged scene. However, CCD technology is relatively expensive and CCD imaging devices consume much more power (100 to 1000 times more) than comparably sized CMOS devices.

A CMOS TDI sensor having active pixels with snapshot capability has been disclosed (see Pain et al., "CMOS Image Sensors Capable of Time-Delayed Integration," NASA Tech Brief Vol. 24, No. 4, pp. i, 1a-8a). Snapshot capability refers to a CMOS pixel structure that uses four or more transistors, including a transfer gate, to isolate charge from one charge integration period from the charge stored in the pixel from a previous charge integration period. Snapshot operation allows the charge integration and readout operations in pixel to be managed independently. However, while a pixel structure with snapshot capability can be used to implement a CMOS TDI sensor, it has disadvantages. In particular, the fill factor and quantum efficiency of a 4T to 6T pixel is less than a three transistor (3T) pixel structure that does not have a snapshot capability.

BRIEF DESCRIPTION OF THE DRAWINGS

The present invention is illustrated by way of example, and not by way of limitation, in the figures of the accompanying drawings in which.

DETAILED DESCRIPTION

Figure 1:
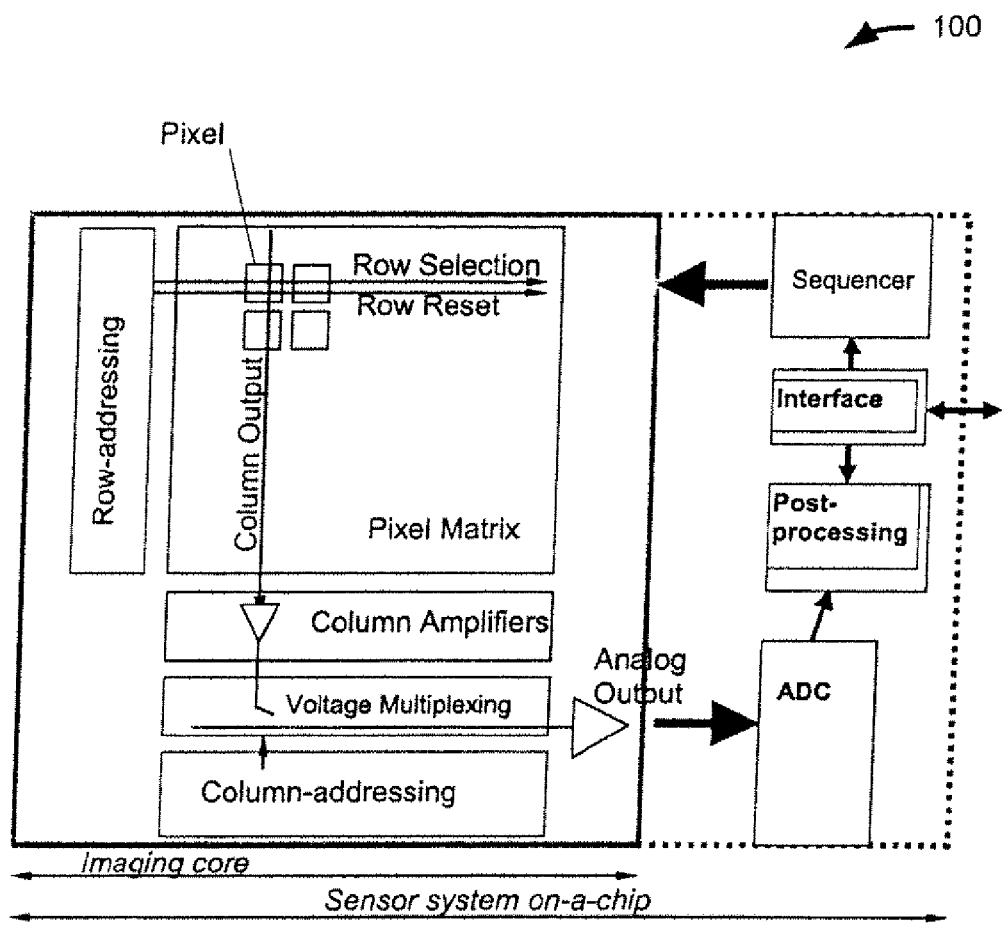
FIG. 1 illustrates a conventional CMOS image sensor.

In the following description, numerous specific details are set forth, such as examples of specific commands, named components, connections, data structures, etc., in order to provide a thorough understanding of embodiments of the present invention. It will be apparent, however, to one skilled in the art that embodiments of present invention may be practiced without these specific details. In other instances, well known components or methods have not been described in detail but rather in a block diagram form in order to avoid unnecessarily obscuring the present invention. Thus, the specific details set forth are merely exemplary. The specific details may be varied from and still be contemplated to be within the spirit and scope of the present invention.

Some portions of the description that follow may be presented in terms of algorithms and symbolic representations of operations on data bits that may be stored within a memory and operated on by a processing device. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters or the like.

Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines, and each of the single signal lines may alternatively be buses.

Methods and apparatus for a time delayed integration (TDI) CMOS sensor with zero desynchronization are described. In one embodiment, a method includes sampling an image that is moving with respect to an imaging array to acquire a number of image samples in a number of time periods, where the ratio of the number of image samples to the number of time periods constitutes an over-sampling ratio, and where each image sample is acquired at a different time than any other image sample is acquired. The method further includes sequentially reading the number of image samples in a rotating line sequence of the imaging array, where each of the image samples is read at a different time than any other image sample is read, and sequentially storing the number of image samples in a number of addition stages in the rotating line sequence of the imaging array, where the ratio of the number of addition stages to the number of time periods constitutes the over-sampling ratio, and where the image includes a number of image points, and where multiple samples of an image point are added in a single addition stage.

In one embodiment, an apparatus includes a number of photosensitive elements in an imaging array selectively connected to a column bus, where each photosensitive element is configured to acquire a number of image samples of an image that is moving with respect to the imaging array in a number of time periods, where the ratio of the number of image samples to the number of time periods constitutes an over-sampling ratio, and where each image sample is acquired at a different time than any other image sample is acquired. The apparatus also includes a number of time delay integration (TDI) stages selectively coupled to the column bus, where the number of TDI stages is configured to sequentially read the number of image samples in a rotating line sequence of the imaging array and to read each image sample at a different time than any other image sample is read, the number of TDI stages constituting a number of addition circuits to sequentially store the number of image samples in the rotating line sequence of the imaging array, where the ratio of the number of TDI stages to the number of time periods constitutes the over-sampling ratio, where the image includes a number of image points, and where each addition circuit is configured to add multiple samples of an image point. Other aspects of the invention will be apparent from the accompanying figures and from the detailed description that follows.

FIG. 1 illustrates a conventional CMOS image sensor architecture 100. The image sensor includes an imaging core that produces an analog output. The imaging core includes the pixel array (the rows and columns of pixels) and peripheral circuits that control the operation of the pixel array.

Each pixel in a CMOS pixel array contains a photosensitive element and at least one switching element to select/deselect the pixel for readout and/or reset operations as described below. The photosensitive element may be, for example, a photodiode, a photogate or a phototransistor. Typically, the switching elements in CMOS image sensors are MOSFET (metal-oxide semiconductor field-effect transistor) devices. CMOS pixels may be passive or active. A passive pixel typically contains only the photosensitive element and a single switching element. An active pixel may contain additional elements (e.g., 2 or more MOSFET transistors) to perform signal amplification and buffering within the pixel.

The imaging core also includes row-addressing circuitry to select rows for readout and reset operations, and column/pixel-addressing circuitry to select pixels for sequential readout. The row-addressing circuitry selects rows by generating row select signals on row select lines. Some image sensors may also include row reset lines for each row. When a row is selected by the row-addressing circuitry, each pixel in the selected row is connected to a column output line. Then, as the column-addressing circuitry sequentially scans the pixels in the selected row, the output signal from each pixel in the row is buffered and/or amplified by a column amplifier in each column. The column amplifiers may perform other operations, such as ordinary or correlated double-sampling to eliminate fixed-pattern noise. The outputs of the column amplifiers are multiplexed onto an output bus and buffered by a buffer amplifier to produce an analog signal stream. Variations of this typical configuration may include more than one output bus and buffer amplifier.

The analog signal stream from the imaging core is converted to a digital data stream by an analog-to-digital converter (ADC). The digital data stream may be optionally processed by a post-processing module (e.g., the post-processing module may be used to perform color correction or pixel interpolation). An interface module handles input-output with external systems (e.g., a camera system) and takes care of protocols, handshaking, voltage conversions and the like. The operations of the imaging core are controlled by a sequencer. The sequencer generates all of the logic signals that control row-addressing, column-addressing, operation of the column amplifiers and output buffer, and voltage multiplexing over the output bus. The sequencer also controls other components of the image sensor, such as the ADC and the post-processor.

It will be apparent to those of ordinary skill in the art that the conventional CMOS imaging architecture is not configured to perform TDI imaging because there is no mechanism for adding multiple samples of a ground pixel as it traverses the CMOS imaging array.

Figure 2A:
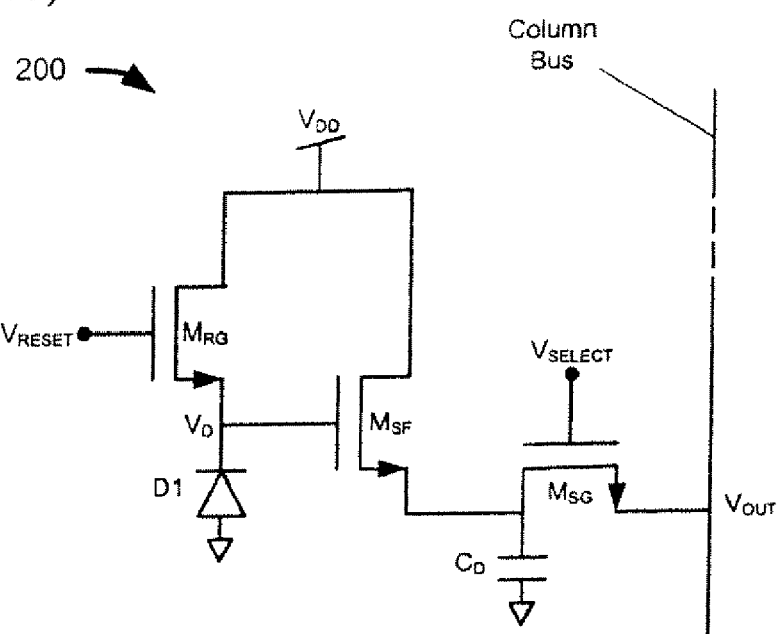
FIG. 2A illustrates a three transistor CMOS pixel.
Figure 2B:
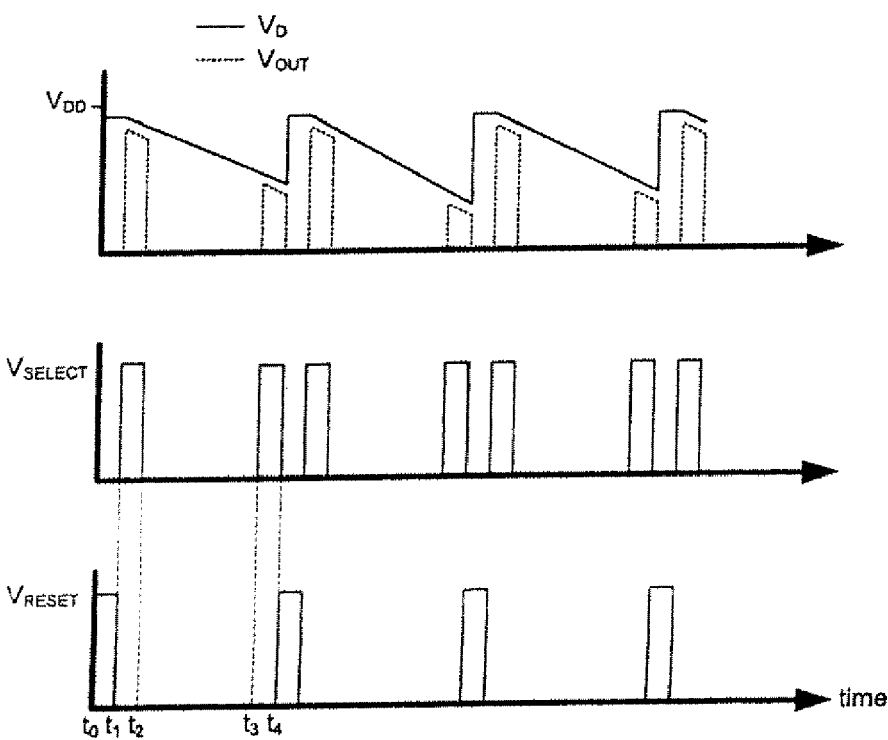
FIG. 2B illustrates the timing of operations in the pixel of FIG. 2A.

FIG. 2A illustrates a conventional 3T CMOS pixel 200. A corresponding timing diagram 250 is illustrated in FIG. 2B. The operation of a 3T pixel is well-known in the art and, accordingly is only described briefly here. A pixel acquisition cycle begins when $V_{RESET}$ is asserted from $t_0$ to $t_1$ to connect photodiode D1 to the power supply voltage $V_{DD}$ through reset gate $M_{RG}$. This operation pre-charges D1 to a voltage just below $V_{DD}$ due to the source-drain voltage drop across $M_{RG}$. $V_D$ is stored on a floating diffusion capacitance $C_D$ through source follower $M_{SF}$. $V_{RESET}$ acts as an electronic shutter, preventing D1 from integrating photocharge as long as $V_{RESET}$ is asserted (photo generated holes are conducted to ground and photo generated electrons are conducted to the power supply $V_{DD}$). In applications where correlated double sampling is used to remove fixed-pattern noise and/or reset noise, $V_{SELECT}$ will be asserted in the $t_1$-$t_2$ interval, as illustrated in FIG. 2B, so that $V_{OUT}$ samples the reset level of D1. At $t_1$, $V_{RESET}$ is de-asserted, allowing D1 to integrate photocharge and reduce the pre-charge voltage on D1. The voltage on D1 is mirrored by the voltage on $C_D$. After a predetermined integration time (exposure time) starting at $t_1$, $V_{SELECT}$ is asserted from $t_3$-$t_4$ so that $V_{OUT}$ samples the integrated voltage on $C_D$. The sequence is then repeated starting at $t_4$.

Figure 3A:
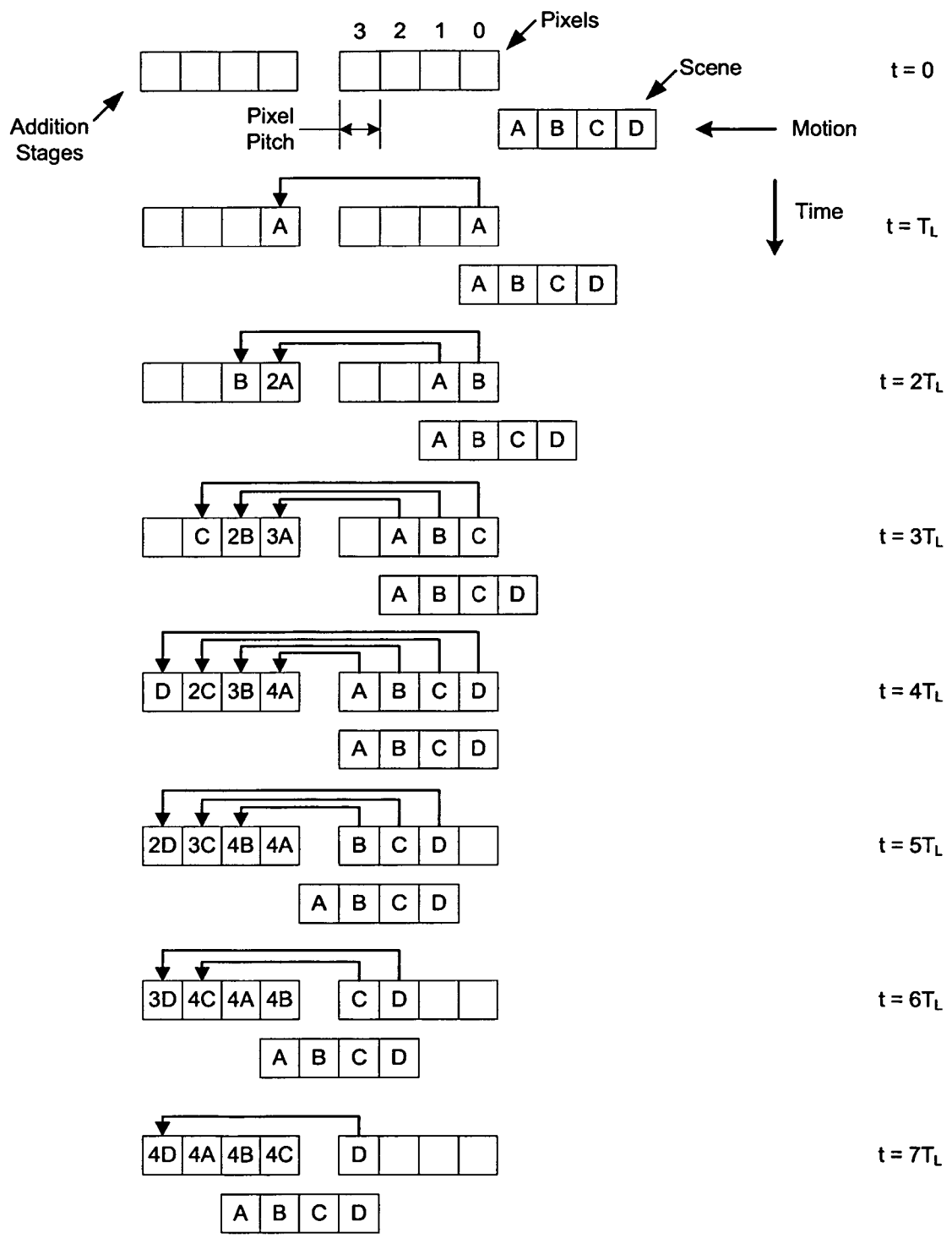
FIG. 3A illustrates time delayed integration in a CMOS image sensor in one embodiment.

FIG. 3A illustrates, conceptually, an ideal TDI implementation in a linear (i.e., single column) sensor that performs signal addition outside of the pixels, as required for a CMOS TDI sensor. To avoid confusion, the term "integration," as used herein, refers to charge generation within a pixel during a period when the pixel is generating photocharge when $V_{RESET}$ is de-asserted. The term "addition," as used herein, refers to the addition of charges (and/or voltages representing charges) external to a pixel. In FIG. 3A, the sensor is moving with constant velocity relative to the imaged object. The relative movement is from left to right. At t=t0, the first scene pixel is aligned with the start of the pixel array. At $t=T_L$, the time it takes the scene to move one pixel pitch, ground pixel A is aligned with and imaged by imager pixel 0 and the signal from pixel 0 is stored in addition stage 0. At $t=2T_L$, ground pixel A is aligned with and imaged by pixel 1 and ground pixel B is aligned with and imaged by pixel 0. The signal from pixel 1 is added to the signal in addition stage 0 and the signal in pixel 0 is stored in addition stage 1. At $t=3T_L$, ground pixels A, B and C are aligned with and imaged by imager pixels 2, 1 and 0 respectively. The signal from pixel 2 is added to the signal stored in addition stage 0, the signal from pixel 1 is added to the signal stored in addition stage 1 and the signal from pixel 0 is stored in addition stage 2. This process is repeated through $t=7T_L$ (for the exemplary 4 pixel sensor) until four samples of each ground pixel are acquired and stored in a corresponding addition stage. The final output of each addition stage (here, with four added samples) is referred to as the TDI pixel.

Figure 3B:
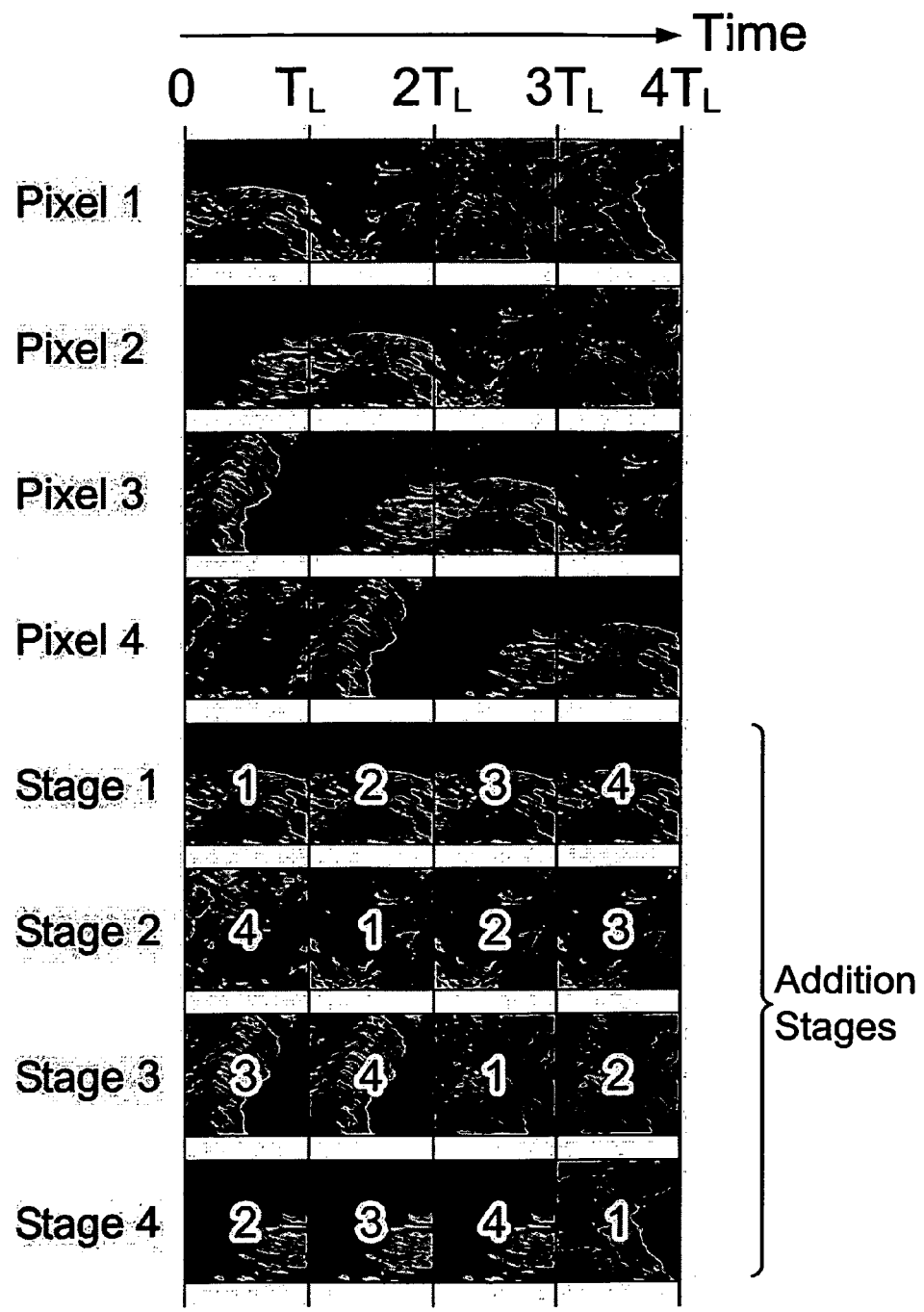
FIG. 3B illustrates ideal time delayed integration in a CMOS image sensor.

FIG. 3B illustrates how the process might appear if each pixel could capture a recognizable portion of a ground scene in its focal plane. In FIG. 3B, $T_L$ is again the time it takes the ground scene to move one pixel pitch on the sensor. For simplicity, it is assumed that the sensor column is four pixels long as illustrated in FIG. 3B. In practice, a sensor may be much longer (e.g. hundreds of pixels) and, theoretically, the upper limit is only bounded by semiconductor wafer size and pixel pitch (which is limited by fabrication technology). The four pixel sensor can capture four samples of each ground scene pixel (recalling that a ground scene pixel is that portion of a ground scene that can be imaged by a single pixel in the image sensor). It will be appreciated that the signal transfers and switching between imaging pixels and addition stages may be accomplished via a switching matrix (e.g., a multiplexer) as is known in the art.

In FIG. 3B, each pixel is illustrated as capturing a recognizable portion of a ground scene in order to provide a visually instructive example. In a real sensor each pixel is only capable of registering an intensity level. In FIG. 3B, the ground scene pixel captured by each of pixels 1 through 4 are shown in a horizontal time scale representing four line times ($T_L$) from t=0 to t=$4T_L$. The ground scene pixels added in the four addition stages over the same time period are also shown. The ground scene pixel imaged by pixel 1 during the first time period (0 to $T_L$) is the same ground scene pixel imaged by pixel 2 during the second time period ($T_L$ to $2T_L$) and so on for the remaining pixels. If the integration time of pixels is equal to the line time, then the following TDI processing must happen instantaneously: the pixel signal is transferred from the pixel to an addition stage; the pixel is reset; the pixel reset level is transferred to the addition stage if correlated double sampling is performed to eliminate fixed-pattern noise.

This problem could be addressed by making the integration time less than the line time to allow additional time for the TDI processing steps. However, reducing the integration time reduces the SNR of each pixel signal because the SNR is proportional to the number of electrons generated during the integration period. However, assuming that these operations can be performed instantaneously or the integration time can be reduced, the same ground scene pixel is acquired sequentially by pixels 1, 2, 3 and 4 and transferred to a given addition stage. As illustrated in FIG. 3B, the first sample of pixel 1 goes to addition stage 2, the second sample of pixel 1 goes to addition stage 2 and so on. Similarly, the second sample of pixel 2 goes to addition stage 1 and the third sample of pixel 2 goes to addition stage 2. This process would be repeated indefinitely as the sensor moves across a ground scene. When an addition stage has received four identical samples, it is read out and the addition stage is ready for a new acquisition cycle. This process only works if the addition of each subsequent pixel image is delayed by exactly one line time. This means that pixel samples, and pixel reset times if correlated double sampling is require, are all transferred synchronously. However, in CMOS image sensor technology, pixels in a column share a common column bus. As a result, signals from the pixels in a column can only be transferred sequentially to the addition stages, not synchronously, and the image samples added in the addition stages are not identical—they are shifted spatially (i.e., desynchronized). Spatial shifting degrades the modulation transfer function (MTF) of the sensor, which is manifested as a loss of spatial frequency resolution.

Figure 4:
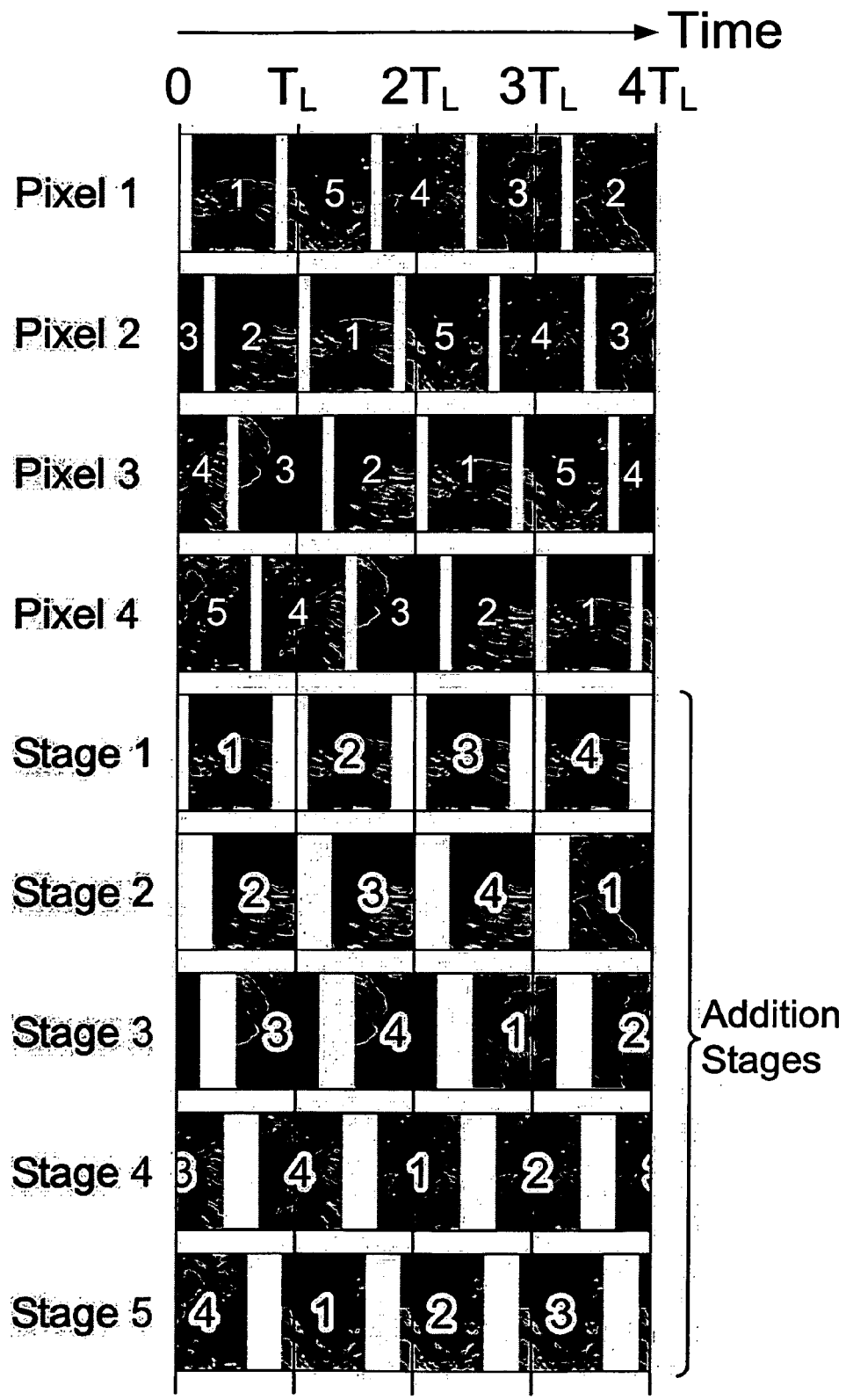
FIG. 4 illustrates time delayed integration in a CMOS image sensor in one embodiment.

FIG. 4 illustrates, conceptually, an aspect of the present invention that provides time for pixel reset and data transfer operations and maintains synchronization (zero desynchronization) without degrading the SNR of the sensor. In FIG. 4, the pixel data rate (number of pixels per unit time) is increased by reducing the charge integration time while keeping the line time constant. This results in additional time (shown as white lines) during each line time for pixel reset and signal transfer from the pixels to the addition stages. As illustrated in FIG. 4, the first charge integration period of pixel 1 is delayed by one white stripe from the origin during which time pixel 1 can be reset and sampled. Similarly, the white stripe following the first integration period of pixel 1 represents time that is available to sample the integrated charge on pixel 1 as described in detail above. The next sample of this scene, acquired by pixel 2, is delayed by one white stripe plus $T_L$ from the origin, and so on. In the addition stages, as illustrated in FIG. 4, the time periods represented by the white stripes allow time for the synchronous addition of the pixel samples, as described above. In FIG. 4, the numbers in the pixel images indicate the number of the addition stage to which that pixel image is sent. Conversely, the numbers in the addition stage images indicate from which imaging pixel the addition stage image came. Note that, because the pixel data rate has been increased, an extra addition stage is required to maintain synchronicity. As a result, even though the integration time per pixel is reduced, the SNR is not affected because the number of added integration periods per ground scene pixel increases in direct proportion to the integration time reduction.

Figure 5:
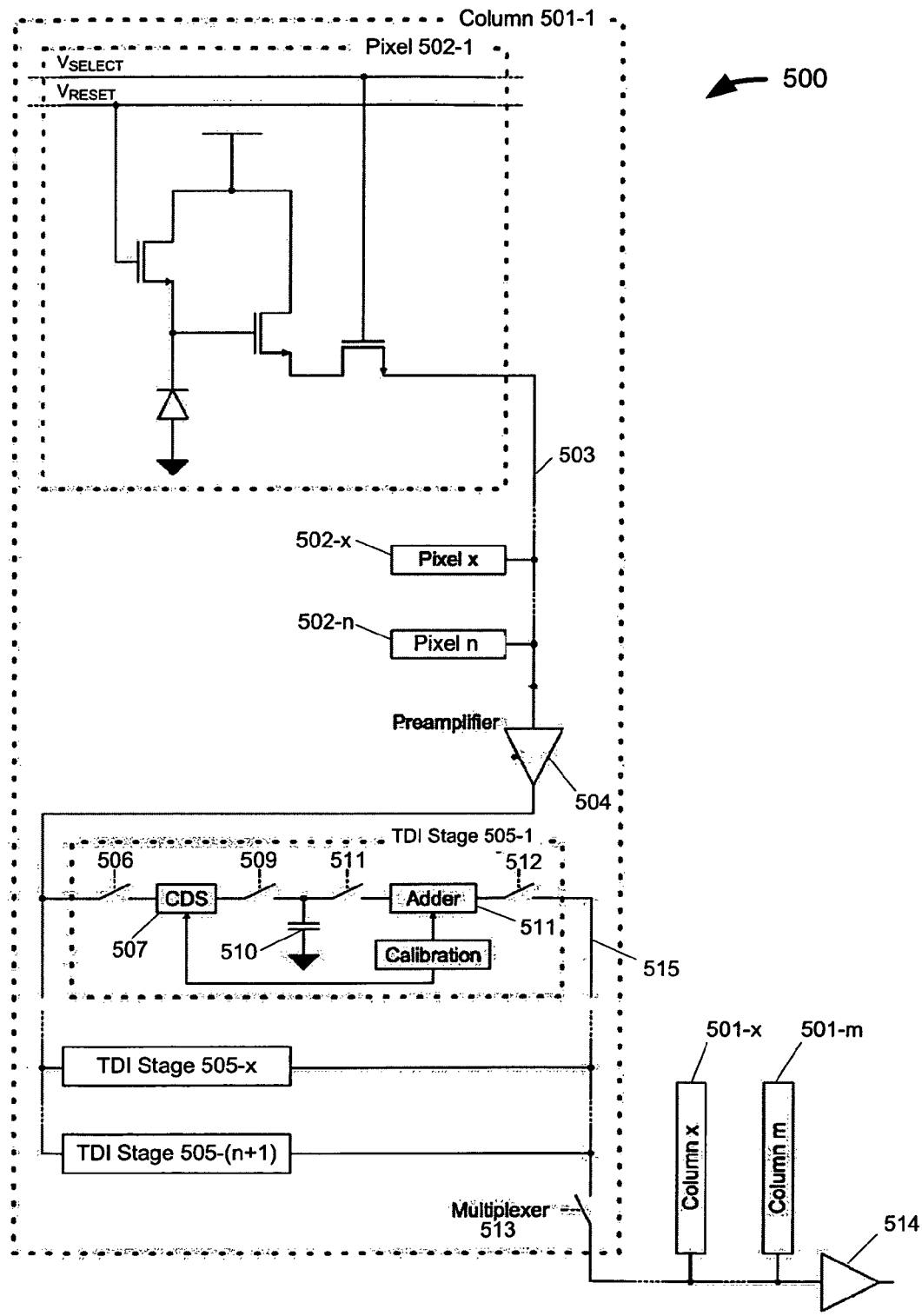
FIG. 5 illustrates a column architecture of a CMOS TDI image sensor in one embodiment.

FIG. 5 illustrates a column architecture 500 in one embodiment of an n row by m column CMOS TDI sensor. In FIG. 5, column 501-1 is a representative column that is replicated in columns 501-x (where 2<x<m−1) through 501-m. Pixel 502-1 is a representative 3T pixel, such as pixel 200 described above, that is replicated in each of pixels 502-x through 502-n. Pixels 502-1 through 502-n are coupled to column bus 503. Column bus 503 is coupled to a preamplifier 504 which buffers the pixel signals and feeds the balance of the column circuitry. Preamplifier 504 is coupled to TDI stages 505-1 through 505-(n+1).

Each TDI stage, such as TDI stage 505-1, is coupled to preamplifier 504 through a column switch, such as column switch 506. TDI stage 505-1 includes an adder circuit 508, and may include a correlated double sampling (CDS) circuit 507. CDS circuit 507 may be coupled to the input of adder circuit 508 through a sample switch 509; a sample capacitor 510 and an adder switch 511 as described below. The output of adder circuit 508 is coupled to a column amplifier 514 through an output switch 512 and a multiplexer 513.

Figure 6A:
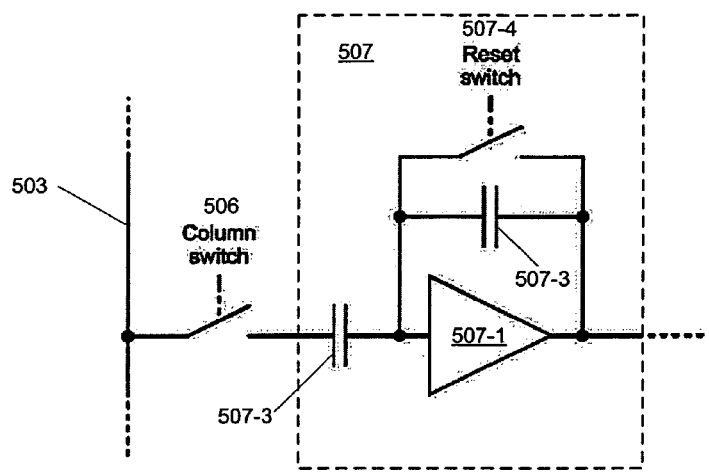
FIG. 6A illustrates a correlated double sampling (CDS) circuit in one embodiment.
Figure 6B:
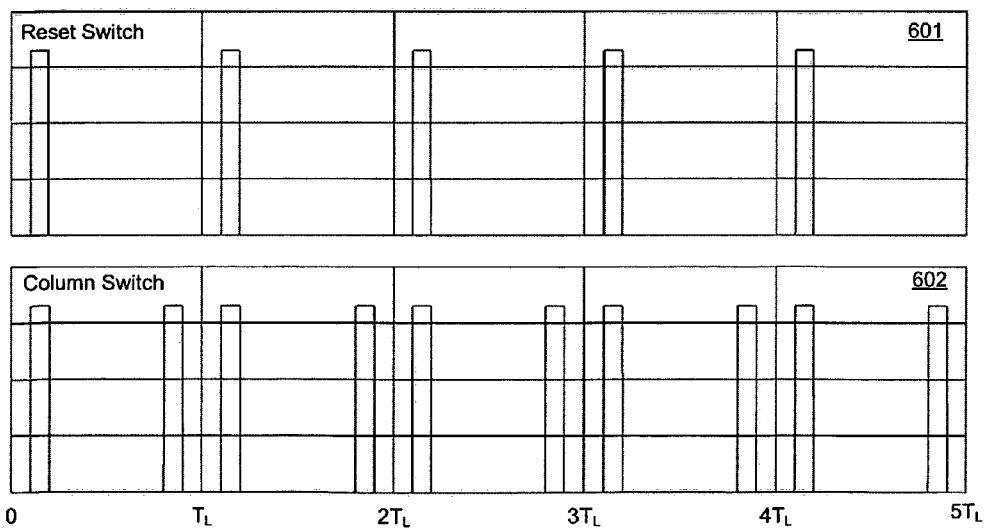
FIG. 6B illustrates the timing of CDS operations in the CDS circuit of FIG. 6A in one embodiment.

FIG. 6A illustrates CDS circuit 507 and column switch 506. CDS circuit 507 includes an amplifier 507-1, a sampling capacitor 507-2, a feedback capacitor 507-3 and a reset switch 507-4. FIG. 6B illustrates the operation of CDS circuit 507. In FIG. 6B, the upper waveform 601 is the control signal for reset switch 507-4 and the lower waveform 602 is the control signal for column switch 506 (where the switches are closed when the respective control voltages are high). The horizontal scale in FIG. 6B is time in units of the line time, $T_L$. Time t=0 in FIG. 6B corresponds to time $t=t_0$ in FIG. 2B, when a pixel reset signal is asserted so that the pixel reset level can be sampled on the column bus 503. During this period, column switch 506 and reset switch 5074 are closed and the pixel reset voltage is sampled on sampling capacitor 507-2. The reset level of the pixel is available at the output of amplifier 507-1. Both switches (506 and 507-4) are then opened (control voltages go low). Then, after a charge integration period in the pixel (corresponding to the period $t_1$ to $t_3$ in FIG. 2B), the signal level of the pixel is sampled to the column bus (from $t_1$ to $t_4$ in FIG. 2B) and column switch 506 is closed again. As a result, the difference between the reset level of the pixel and the signal level of the pixel is available at the output of amplifier 507-1. This sequence is repeated during each line time period, as illustrated in FIG. 6B.

Figure 7A:
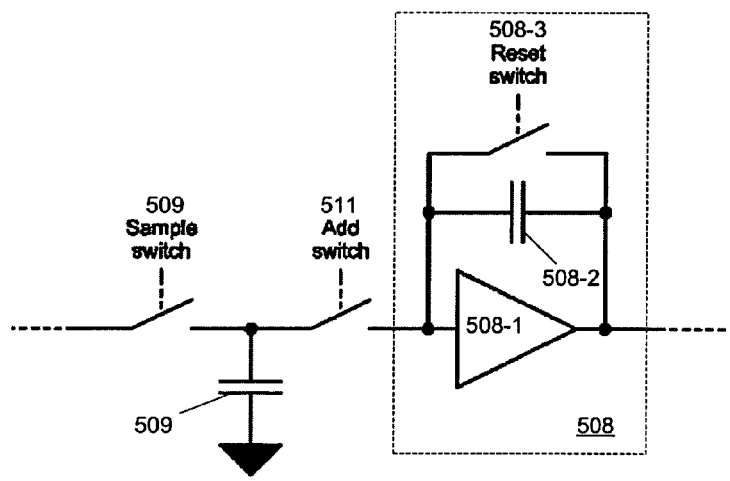
FIG. 7A illustrates an adder circuit in one embodiment.
Figure 7B:
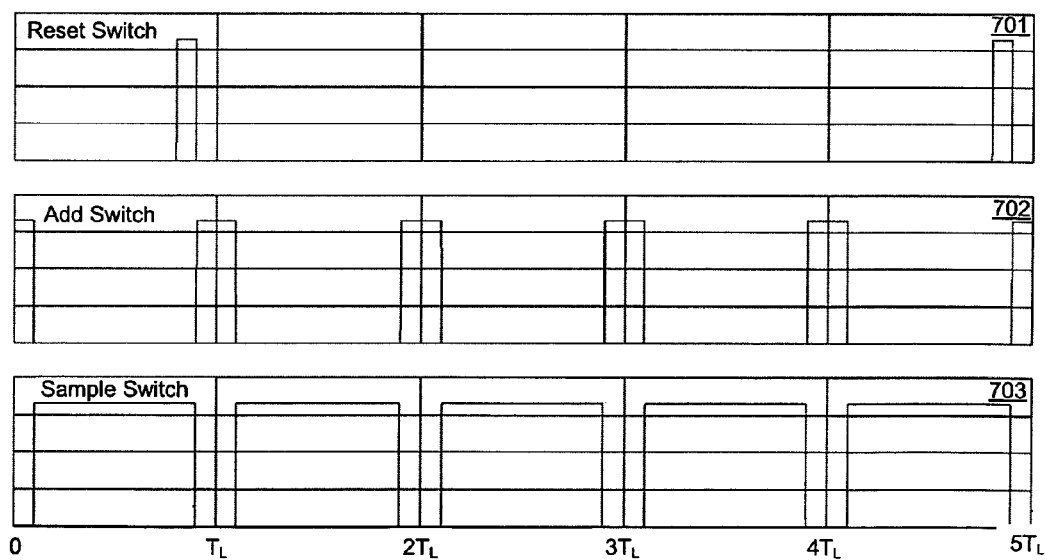
FIG. 7B illustrates the timing of operations in the adder circuit of FIG. 7A in one embodiment.

FIG. 7a illustrates adder circuit 508, sample switch 509, sample capacitor 510 and add switch 511. Adder circuit 508 includes amplifier 508-1, feedback capacitor 508-2 and reset switch 508-3. FIG. 7B illustrates the operation of adder circuit 508. In FIG. 7B, the upper waveform 701 is the control signal for reset switch 508-3, the middle waveform 702 is the control signal for add switch 511 and the lower waveform 703 is the control signal for sample switch 509. The horizontal scale in FIG. 7B corresponds with the horizontal scale in FIG. 6B. An addition sequence begins with the reset of the feedback capacitor 508-2 with the closure of reset switch 508-3, as illustrated by waveform 701 in the first line time period. During this time, as illustrated by waveform 703, sample switch 509 is closed and the CDS signal is sampled on sample capacitor 510 (or, if a CDS circuit is not used, the signal level of the pixel is sampled directly). Next, as illustrated by waveforms 701 and 703, reset switch 508-3 and sample switch 509 are opened. At the same time, add switch 511 is closed, as illustrated by waveform 702, and the sampled signal is transferred to the feedback capacitor 508-2. Reset switch 508-3 remains open while the foregoing sequence is repeated for sample switch 509 and add switch 51 for the number of line times (four, in this example) corresponding to the number of pixels in the column. When the last addition is performed, output switch 512 is closed (control waveform not shown), connecting the adder circuit 508 to the output bus 515 and multiplexed to column amplifier 514 through multiplexer 513. Lastly, reset switch 508-3 and sample switch 509 are closed, as illustrated by waveforms 701 and 703 during the last line time period, to restart the addition cycle.

The operation of a TDI sensor would normally require the synchronous transfer of the pixel reset level and the synchronous transfer of the pixel signal level to the CDS circuit 507 for all of the active lines of the sensor array (i.e., all of the pixels in a given column, such as column 503). However, as the pixel outputs are multiplexed through a single column bus (e.g., column bus 503) for each column, this is not possible. In order achieve synchronization (zero desynchronization) from line to line and manage a non-zero readout time for every line, the total pixel integration time is less than the line time. In the following description, let n be the number of active TDI lines (i.e., number of rows n); let $T_L$ be the line time; let $T_I$ be the per pixel integration time; and let ITRF be the integration time reduction factor (defined as the ratio $nT_I/T_L$).

Figure 8:
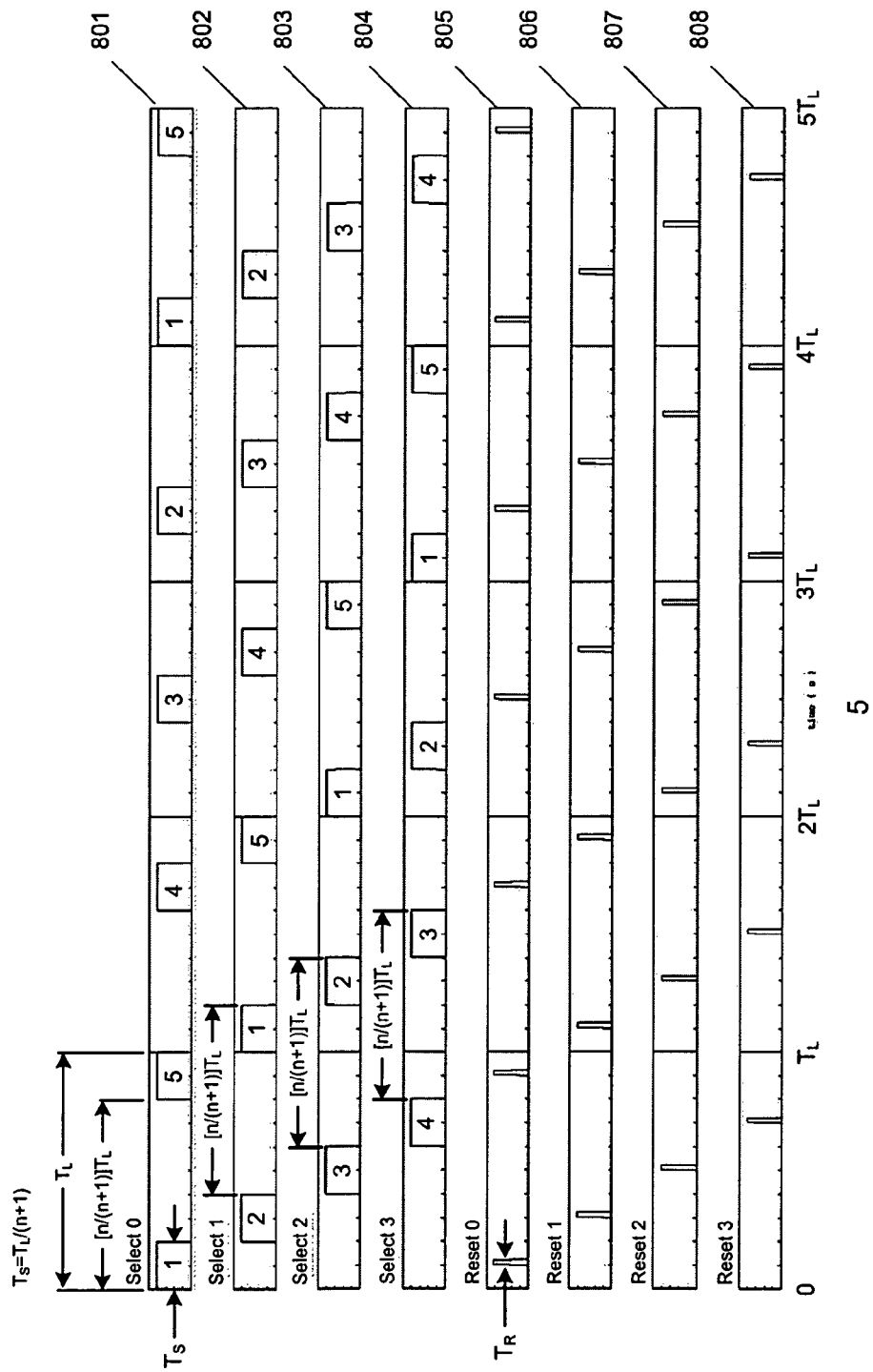
FIG. 8 is a timing diagram illustrating pixel timing in one embodiment.

FIG. 8 is a timing diagram illustrating the timing of pixel control signals $V_{SELECT}$ and $V_{RESET}$ in one embodiment for each of the four pixels in the exemplary n=4 pixel CMOS TDI sensor described above. In FIG. 8, waveforms 801 through 804 reflect the timing of $V_{SELECT}$ for pixels 0 through 3 respectively, and waveforms 805 through 808 reflect the timing of $V_{RESET}$ for pixels 0 through 3 respectively. Recall that when $V_{SELECT}$ is high, the corresponding pixel output is connected to the column bus. When $V_{RESET}$ is high, the photodiode (e.g., D1) voltage $V_D$ is set to a known voltage, and when $V_{RESET}$ is released the photodiode begins to integrate photocharge. As illustrated by waveforms 801 through 804, pixels 0 through 3 are selected sequentially and contiguously in less than a line time, $T_L$, so that the first pixel (pixel 0) can be selected a second time within the line time, $T_L$. The duration, $T_S$, of each $V_{SELECT}$ period is chosen such that $T_S=T_L/(n+1)$. Within each $V_{SELECT}$ time period, $T_S$, the corresponding $V_{RESET}$ is asserted for a time $T_R$, as illustrated by waveforms 805 through 808, so the total integration time per pixel is given by $T_I=T_S-T_R$. Within the time period $T_S$, both the pixel reset level and the pixel signal level can be read and fed to a CDS circuit (e.g., CDS circuit 507) as described above.

In FIG. 8, the numbers in the $V_{SELECT}$ timing waveforms indicate which TDI stage receives each particular sample. As shown in FIG. 8, for an n line TDI sensor, each sensor samples the image n+1 times in n line times, that the n TDI sensors take a total of n+1 image samples in each line time and that each point in the image is sampled n+1 times in n line times. Thus, FIG. 8 illustrates spatial and temporal over-sampling where the over-sampling ratio is given by (n+1)/n.

Assuming that a scene is entering the focal plane of an n pixel CMOS TDI sensor, as described above, the time required for any scene pixel to transit the focal plane of the sensor is $nT_L$, by definition. However, as described above, the pixel acquisition rate is given by $1/T_S=(n+1)/T_L$ pixels per unit time. Therefore, the integration time reduction factor, ITRF, can be derived as:

$$ITRF = \frac{T_I}{T_L} = \frac{(T_S - T_R)}{T_L} = T_S \frac{(1 - T_R/T_S)}{T_L} = \frac{(1 - T_R/T_S)}{n+1}$$

Figure 9:
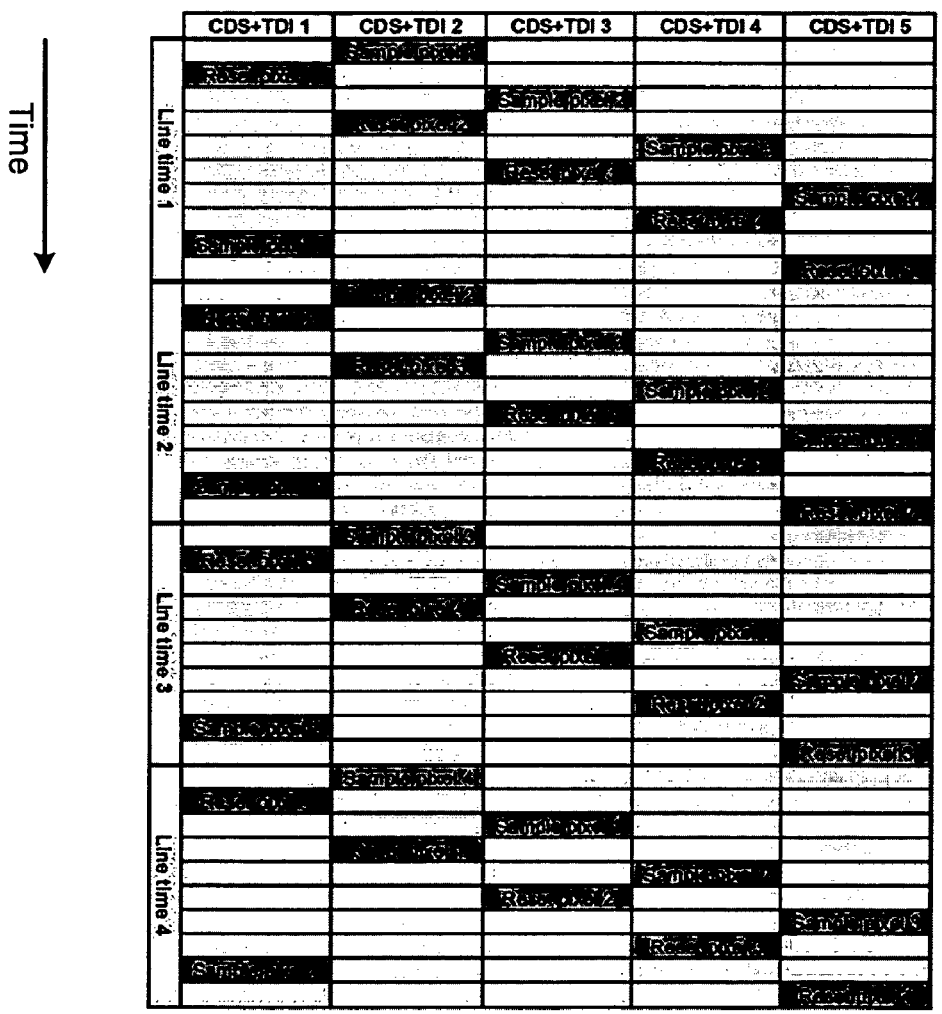
FIG. 9 is a timing chart illustrating a sequence of TDI pixel grabbing in one embodiment.

FIG. 9 is a timing chart 900 illustrating the resultant timing of TDI pixel grabbing (the TDI pixel is defined as the contents of the TDI stage adder after n samples) for the exemplary n=4 TDI CMOS sensor. In FIG. 9, time runs top to bottom. The dark shaded rectangles indicate when a TDI stage is accessing a pixel via the column bus, where only one TDI stage can access the column bus at a time. The light shaded rectangles indicate that the corresponding pixel has previously been read and is integrating photocharge.

A delay will exist between the start of a line time and the start of the integration of a given ground pixel in the line time (referred to as TDI stage delay). This delay will be different for each ground pixel due to the difference between the pixel rate and the line rate. It will be appreciated that the differential delay is due to spatial oversampling in one direction, not MTF degradation.

Figure 10:
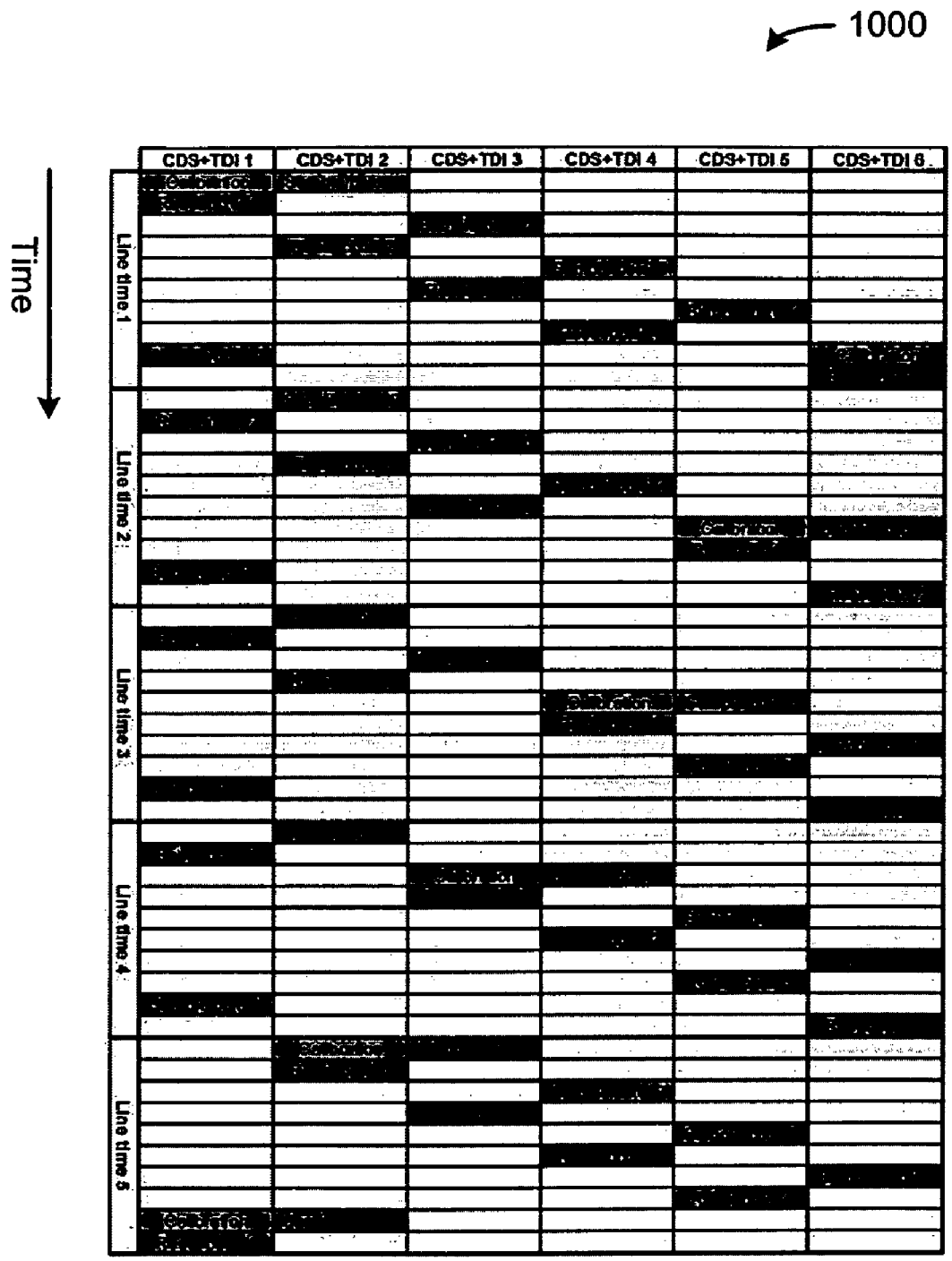
FIG. 10 is a timing chart illustrating a sequence of pixel grabbing including timing calibration in one embodiment.
Figure 11:
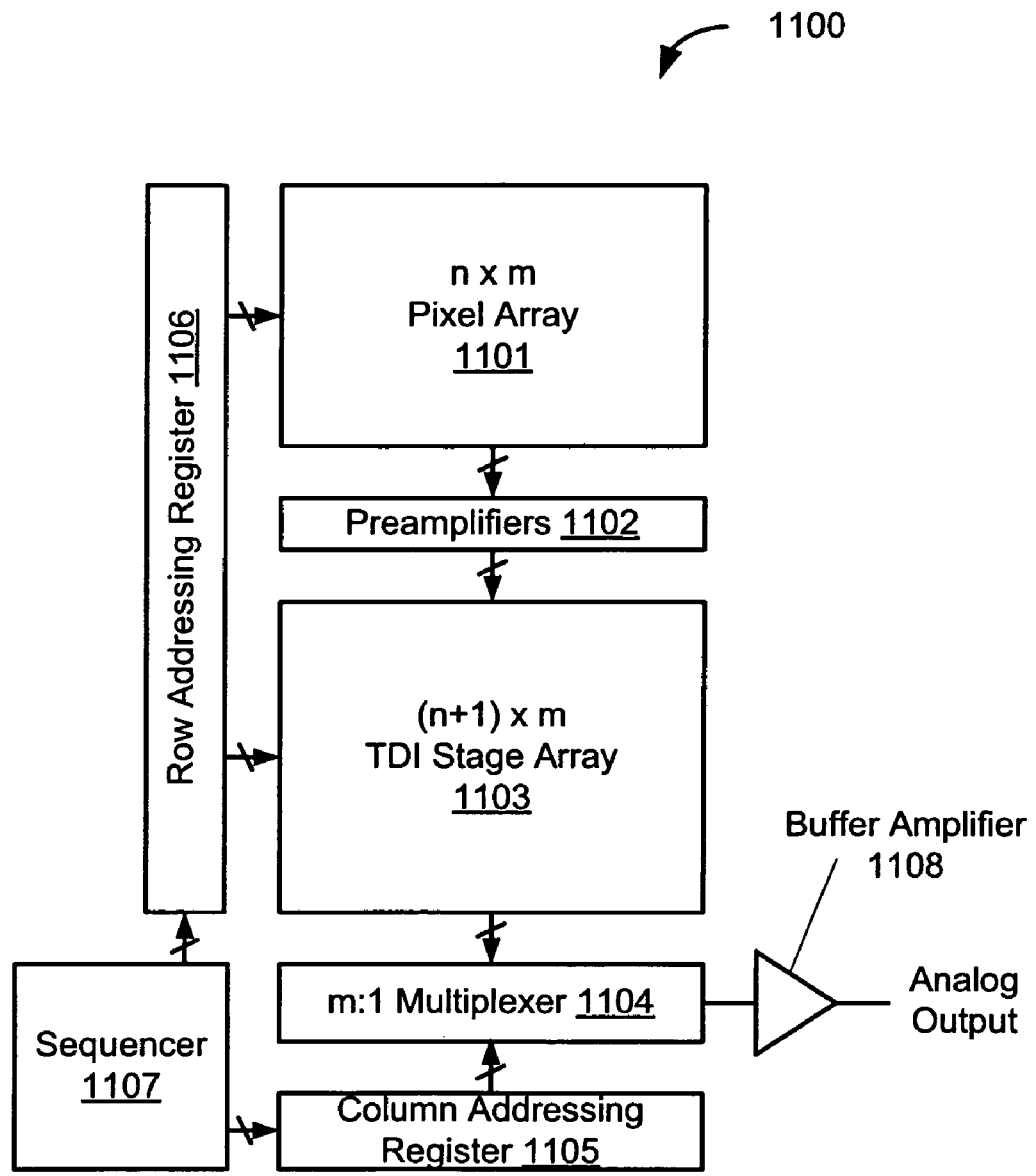
FIG. 11 is a block diagram illustrating a CMOS TDI image sensor in one embodiment.

In one embodiment, the timing of pixel operations (reset, select) may be calibrated to the timing of CDS and adder operations in the TDI stages to prevent pixel drop and/or signal loss). This may be accomplished with a timing calibration circuit (e.g., calibration circuit 515 in FIG. 5) by adding an additional TDI stage such that the total number of TDI stages will be n+2 for an n pixel sensor. FIG. 10 is a timing chart 1000 illustrating the resultant TDI pixel grabbing sequence, where n+2 (where n=4 in FIG. 10) TDI stages are used in a rolling sequence, entering a calibration operation between each complete TDI sequence. The amount of data that is processed remains the same, but because there is one extra TDI stage, each stage is periodically idle, allowing a timing offset calibration to be performed. Timing calibration circuits are known in the art. Accordingly, no detailed discussion is provided here, FIG. 11 is a block diagram of an image sensor 1100 in which embodiments of the present invention may be implemented. The image sensor 1100 includes an n×m pixel array containing n rows of pixels in each of m columns such as pixel 502-1 in column 501-1. Pixel array 1101 is coupled to m preamplifiers 1102 containing preamplifiers such as preamplifier 504. The outputs of preamplifiers 1102 are coupled to an (n+1)×m TDI stage array 1103 containing TDI stages such as TDI stage 505-1. It will be appreciated that the (n+1)×m TDI stage array may be replaced with an (n+2)×m TDI stage array to implement the periodic calibration function described above. The outputs of TDI stage array 1103 are multiplexed through an m:1 multiplexer to an analog buffer amplifier 1108. Also included in the image sensor 1100 is a row-addressing register 1106, to reset and select rows of the pixel array 1101 and to control the operations of TDI stage array 1103 as described above. Image sensor 1100 also includes column addressing register 1105 to select columns in the TDI stage array 1103 via multiplexer 1104. Image sensor 1100 also includes a sequencer 1107 to sequence the operations of row addressing register 1106 and column addressing register 1105. Sequencer 1107 may be, for example, a finite state machine. Alternatively, sequencer 1107 may be a hard and/or soft programmable processing device containing and executing sequences of instructions for the operation of image sensor 1100.

Figure 12:
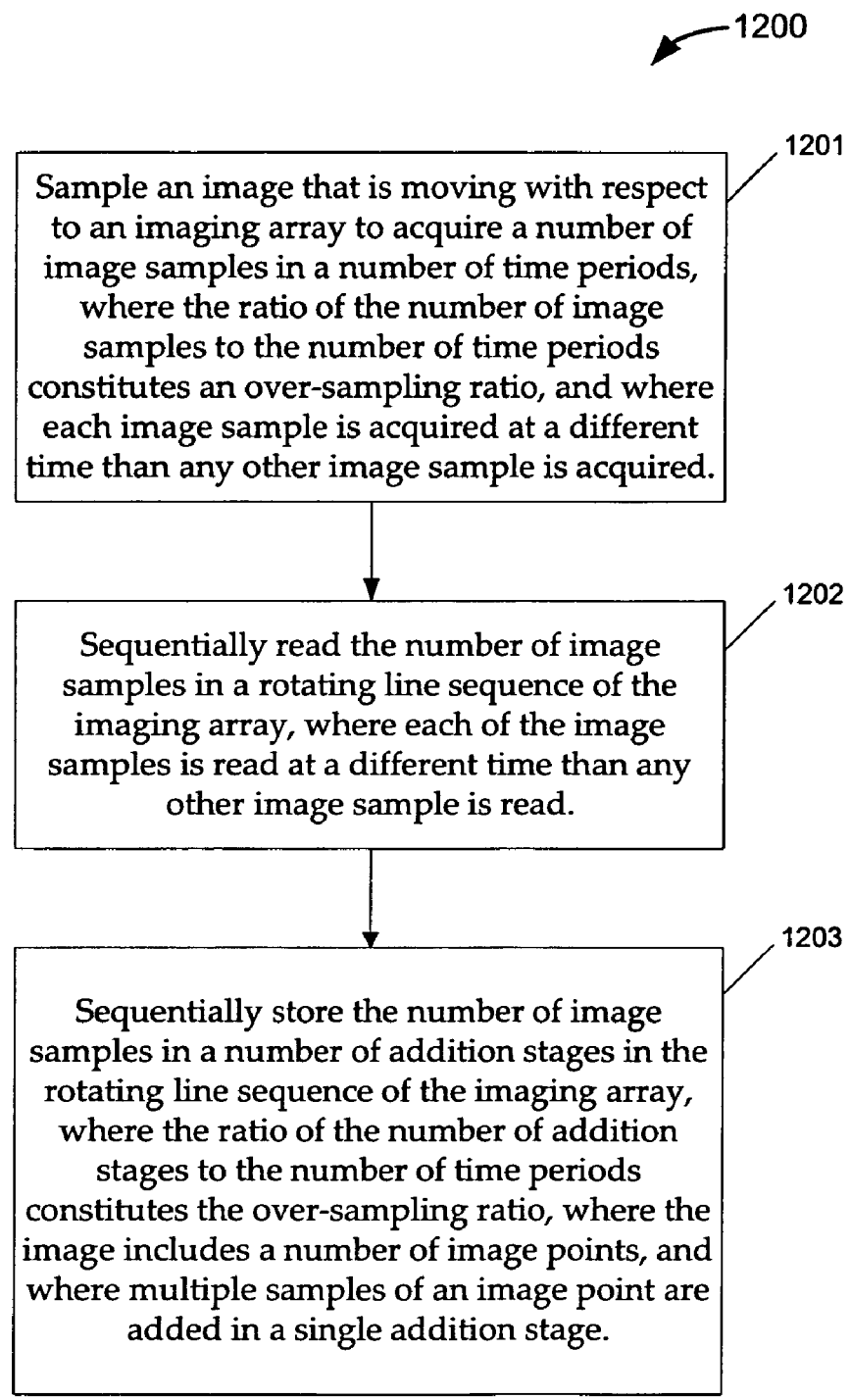
FIG. 12 is a flowchart illustrating a method a one embodiment.

FIG. 12 is a flowchart illustrating a method 1200 in one embodiment of time delayed integration with zero desynchronization in a CMOS image sensor. In operation 1201, an image that is moving with respect to an imaging array is sampled (e.g., by n×m pixel array 1101) to acquire a number (e.g., n+1) of image samples in a number (e.g., n) of time periods, where the ratio of the number of image samples to the number of time periods (e.g., n/(n+1)) constitutes an over-sampling ratio, and where each image sample is acquires at a different time (e.g., as illustrated in FIG. 8) than any other image sample is acquired. In operation 1202, the number of image samples are read sequentially in a rotating line sequence of the imaging array, where each of the image samples is read at a different time than any other image sample is read. In operation 1203, the number of image samples are sequentially stored in a number of addition stages (e.g., n+1) in the rotating line sequence of the imaging array, where the ratio of the number of addition stages to the number of time periods constitutes the over-sampling ratio, where the image includes a number of image points, and where multiple samples (e.g., n) of an image point are added in a single addition stage.

The CMOS TDI image sensor discussed herein may be used in various applications. For example, the CMOS TDI image sensor discussed herein may be used in satellite or aerial surveillance, machine vision applications and/or document scanning operations. While some specific embodiments of the invention have been shown the invention is not to be limited to these embodiments. The invention is to be understood as not limited by the specific embodiments described herein, but only by scope of the appended claims. While embodiments of the invention have been described in terms of CMOS device technology, the methods and apparatus described herein is not limited to CMOS. For example, embodiments of the invention may be implemented in NMOS, PMOS, BiCMOS or Bipolar device technologies.

What is claimed is:

1. A method, comprising:
    sampling an image that is moving with respect to an imaging away to acquire a plurality of image samples in a plurality of time periods, wherein a ratio of the plurality of image samples to the plurality of time periods comprises an over-sampling ratio, and wherein each image sample is acquired at a different time than any other image sample is acquired;
    sequentially reading the plurality of image samples in a rotating line sequence of the imaging array, wherein each of the image samples is read at a different time than any other image sample is read; and
    sequentially storing the plurality of image samples in a plurality of addition stages in the rotating line sequence of the imaging array, wherein a ratio of the plurality of addition stages to the plurality of time periods comprises the over-sampling ratio, wherein the image comprises a plurality of image points, and wherein multiple samples of an image point are integrated in a single addition stage.

2. The method of claim 1, wherein sampling the image comprises acquiring samples of the image with n photosensitive elements comprising n lines of the imaging array, wherein a point in the moving image transits the n photosensitive elements in n line times, wherein the n photosensitive elements acquire n+1 samples of the point in the moving image in the n line times, wherein the n photosensitive elements acquire n+1 samples of the moving image during each line time, wherein each photosensitive element acquires n+1 samples of the moving image during the n line times, and wherein the n photosensitive elements acquire samples of the moving image at different times during each line time.

3. The method of claim 1, wherein sequentially reading the plurality of image samples comprises reading n+1 image samples in the rotating line sequence of the imaging away from the n photosensitive elements during n successive line times, wherein no two photosensitive elements are read at the same time during each line time.

4. The method of claim 1, wherein sequentially storing the plurality of image samples comprises storing the n+1 image samples in the rotating line sequence of the imaging away in n+1 corresponding addition stages, wherein image samples of a point in the moving image are added n times in one of the n+1 addition stages.

5. The method of claim 1, wherein sequentially storing the plurality of image samples comprises storing the n+1 image samples in the rotating line sequence of the imaging away in n+2 corresponding addition stages, wherein image samples of a point in the moving image are added n times in one of the n+2 addition stages.

6. The method of claim 5, wherein one of the n+2 addition stages is calibrated during each line time.

7. The method of claim 2, wherein each sample of the image comprises a rest level and a signal level.

8. The method of claim 3, wherein sequentially reading the plurality of image samples comprises reading a reset level and a signal level from each of the photosensitive elements in the rotating line sequence of the imaging array.

9. The method of claim 4, wherein sequentially storing the plurality of image samples comprises:
    storing a reset level of an imaging pixel;
    subtracting a signal level of the imaging pixel from the reset level of the imaging pixel to obtain a difference signal; and
    storing the difference signal.

10. An apparatus, comprising:
    a plurality of photosensitive elements in an imaging away selectively connected to a column bus, wherein each photosensitive element is configured to acquire a plurality of image samples of an image that is moving with respect to the imaging array in a plurality of time periods, wherein a ratio of the plurality of image samples to the plurality of time periods comprises an over-sampling ratio, and wherein each image sample is acquired at a different time than any other image sample is acquired;
    a plurality of time delay integration (TDI) stages selectively coupled to the column bus, wherein the plurality of TDI stages is configured to sequentially read the plurality of image samples in a rotating line sequence of the imaging array and to read each image sample at a different time than any other image sample is read, the plurality of TDI stages comprising a plurality of addition circuits to sequentially store the plurality of image samples in the rotating line sequence of the imaging array, wherein a ratio of the plurality of TDI stages to the plurality of time periods comprises the over-sampling ratio, wherein the image comprises a plurality of image points, and wherein each addition circuit is configured to add multiple samples of an image point.

11. The apparatus of claim 10, wherein the imaging away comprises n active pixels comprising n lines of the imaging array, wherein a point in the moving image transits the imaging away in n line times, wherein the n active pixels are configured to acquire n+1 samples of the point in the moving image in the n line times and to acquire n+1 samples of the moving image during each line time, wherein each active pixel is configured to acquire n+1 samples of the moving image during the n line times and to acquire samples of the moving image at different times during each line time.

12. The apparatus of claim 11, wherein the plurality of TDI stages comprises n+1 TDI stages and wherein to sequentially read the plurality of image samples, the n+1 TDI stages are configured to read n+1 image samples in the rotating line sequence of the imaging away from the n active pixels during the n line times, wherein no two active pixels are read at the same time during each line time.

13. The apparatus of claim 12, wherein the n+1 TDI stages comprise n+1 addition circuits, wherein to sequentially store the plurality of image samples, each of the n+1 addition circuits is configured to add n samples of an image point.

14. The apparatus of claim 11, wherein the plurality of ill! stages comprises n+2 TDI stages and wherein to sequentially read the plurality of image samples, the n+2 TDI stages are configured to read n+1 image samples in the rotating line sequence of the imaging away from the n active pixels during the n line times, wherein no two active pixels are read at the same time during each line time.

15. The apparatus of claim 14, wherein each TDI stage comprises calibration circuitry configured to calibrate one of the n+2 TDI stages during each line time.

16. The apparatus of claim 10, wherein each image sample comprises a pixel reset level and a pixel signal level, wherein each TDI stage comprises a correlated double sampling circuit configured to store a difference signal comprising a difference between the pixel reset level and the pixel signal level.

17. A system, comprising:

an area array of photosensitive elements configured to generate spatially and temporally over-sampled image data of an image in motion with respect to the array, the away comprising a width of m photosensitive elements in a crosstrack dimension and a length of n lines of photosensitive elements in an alongtrack dimension, wherein points in the image transit the n lines in n line times, and wherein each photosensitive element in a line samples image data at a different time than any other photosensitive element in the line; and a time delayed integration (TDI) stage array coupled with the area away to sequentially read and store the spatially and temporally over-sampled image data, the TDI stage array comprising a width of m TDI stages and a length of at least n+1 TDI stages, wherein n+1 copies of each image point are added during the n line times to obtain an output value of each image point.

18. The system of claim 17, further comprising an m to 1 multiplexer to sequentially read m TDI stages containing an output value of m different image points.

* * * * *